(12) United States Patent
Hilaire

(10) Patent No.: US 6,655,404 B2
(45) Date of Patent: Dec. 2, 2003

(54) ACTUATOR CONTROL DEVICE

(75) Inventor: Jean-François Hilaire, Valence (FR)

(73) Assignee: Crouzet Automatismes, Valence (FR)

( * ) Notice: Subject to any disclaimer, the term of this patent is extended or adjusted under 35 U.S.C. 154(b) by 261 days.

(21) Appl. No.: 09/829,982

(22) Filed: Apr. 11, 2001

(65) Prior Publication Data

US 2002/0005501 A1 Jan. 17, 2002

(30) Foreign Application Priority Data

Apr. 18, 2000 (FR) .............................. 00 04981

(51) Int. Cl.$^7$ ................................. F15B 5/00
(52) U.S. Cl. .................. 137/86; 137/487.5; 251/129.04
(58) Field of Search ............ 251/129.04; 137/86, 137/487.5

(56) References Cited

U.S. PATENT DOCUMENTS 4,456,434 A * 6/1984 El Ibiary ............ 137/625.65 X
4,714,005 A * 12/1987 Leemhuis .......... 137/624.11 X
6,269,838 B1 * 8/2001 Woodworth et al. ... 251/129.04 X

FOREIGN PATENT DOCUMENTS

| EP | 0 111 016 | 6/1984 |
| WO | WO 97/11414 | 3/1997 |
| WO | WO 98/44267 | 10/1998 |

* cited by examiner

*Primary Examiner*—Kevin Lee
(74) *Attorney, Agent, or Firm*—Oblon, Spivak, McClelland, Maier & Neustadt, P.C.

(57) ABSTRACT

The invention refers to a control device for an actuator (1). The device, controlled by a control valve (20; 71; 80, 81), comprises slides (30, 31) to obtain different conditions of the control valve, and these slides (30, 31) are activated by a two-position fluidics solenoid valve (32, 33) to which a set-point instruction is applied (6). The control device comprises a processor (10) to be assured of the response of the solenoid valve depending on the set-point instruction (6) over the full range that the actuator (1) can cover.

9 Claims, 5 Drawing Sheets

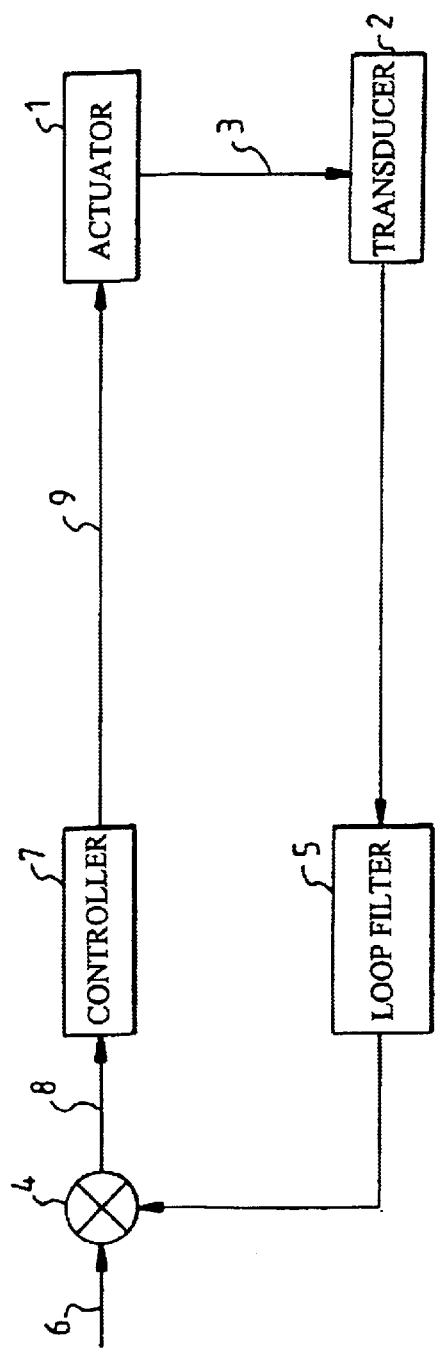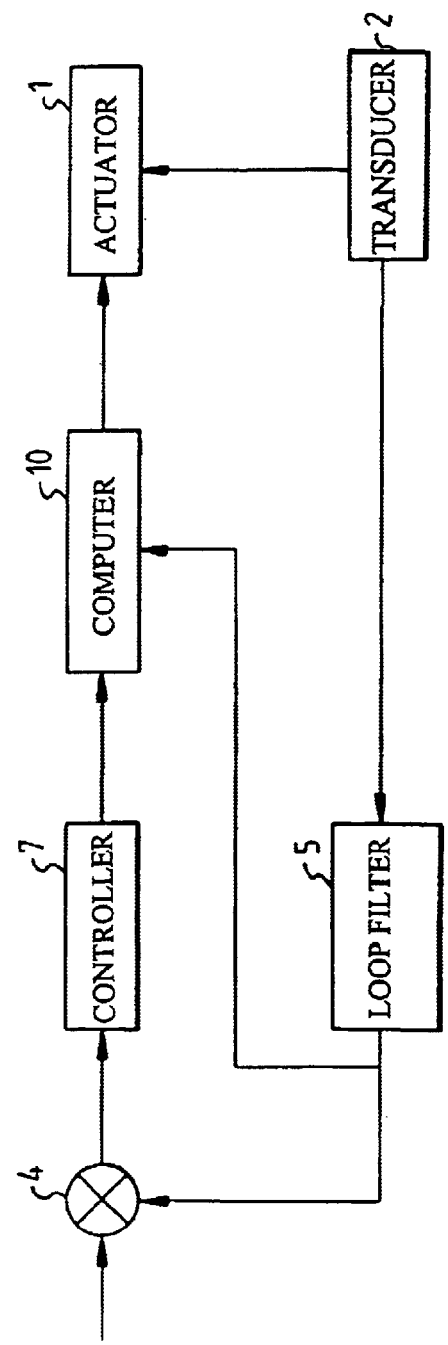

ACTUATOR CONTROL DEVICE

BACKGROUND OF THE INVENTION

The invention concerns a control device for an actuator.

The invention is described in keeping with a pneumatic double-acting cylinder used as actuator, but of course it is understood that the invention can be implemented whatever the type of actuator as, for example, a hydraulic cylinder whether single or double-acting.

To control a pneumatic double-acting cylinder by means of a valve usually referred to as 4-3 comprising four-way three position control is known in the art. A set-point, for example electric, is converted into compressed air which is used to move the air slide valves, for example by using a conversion device known as vane nozzle. In such a device, the electric set-point passes through an electromagnet designed to move a vane plugging or not a nozzle supplied by a source of compressed air, in keeping with the set-point instruction status.

In industry, a level of electric set-point giving out a current of between 4 and 20 milliamps with a voltage in the region of 10 to 30 volts is used currently. With a vane-nozzle device, the electric energy of the set-point is directly converted into compressed air without it being necessary to provide supplementary energy to carry out the conversion. The vane-nozzle devices are not very accurate and consume a considerable quantity of compressed air due to a practically continuous air leak from the nozzle.

To alleviate the disadvantages of vane-nozzle devices, the conversion has been carried out using monostable solenoid valves. These solenoid valves are far more accurate than the vane-nozzle devices, but the energy provided by the electric set-point is not sufficient to cycle the solenoid valves. Conventional solenoid valves require electric power in the region of one Watt in order to be cycled. To do this, means supplied by a source of outside electric voltage for amplifying the set-point are used, for example 24 Volts.

Because of this outside voltage source, one cannot directly replace a vane-nozzle device by conversion means comprising monostable solenoid valves. Moreover, supply by the outside voltage source prevents obtaining a homologation in intrinsic safety. More precisely, it is possible to use a system accredited in inherent safety in an explosive atmosphere without an explosive-proof jacket being necessary—what is more the outside source of voltage requires such an explosive-proof casing.

Recent developments in the field of solenoid valves facilitate avoiding recourse to an outside voltage source by using piezoelectric solenoid valves which can be controlled directly by a set-point of between 4 and 20 milliamps. On the other hand, piezoelectric solenoid valves present a number of disadvantages, notably their much higher price compared to conventional monostable solenoid valves and their low flux density displacement, in this way restricting the air flow which they are likely to switch over, and consequently their ability to move an air slide valve.

SUMMARY OF THE INVENTION

The aim of the invention is to alleviate these various disadvantages by offering a control device for an actuator which is far more accurate and which consumes less air than a vane-nozzle device, using neither outside voltage source nor piezoelectric solenoid valve.

To attain this aim, the invention has an actuator control device controlled by a control valve comprising the means to obtain different valve conditions, typified in that the means to obtain different valve conditions are activated by at least one two-position fluidics solenoid valve to which a set-point is applied and in that the control device comprises the means to be assured of the response of the solenoid valve depending on the set-point over the whole range that the actuator can cover.

The means to obtain different conditions of the control valve usually comprise slides. It is possible to replace, for example, these slides by rotary valves, cylinders or check valves likely to block nozzles. To simplify further description, one will use the term "slide" to describe means to obtain different conditions of the valve whatever the method of realization of these means.

BRIEF DESCRIPTION OF THE DRAWINGS

The invention will be better understood and other advantages will be revealed on reading the detailed description of a method of realization, illustrated in the attached drawing in which:

FIG. 1 represents a control device for an actuator;

FIG. 2 represents the device in FIG. 1, comprising moreover means so as to be assured of the response of the solenoid valve depending on the set-point over the whole range that the actuator can cover;

To simplify the description, the same topological markings will represent the same elements in the different figures.

DESCRIPTION OF THE PREFERRED EMBODIMENTS

Figure 3:
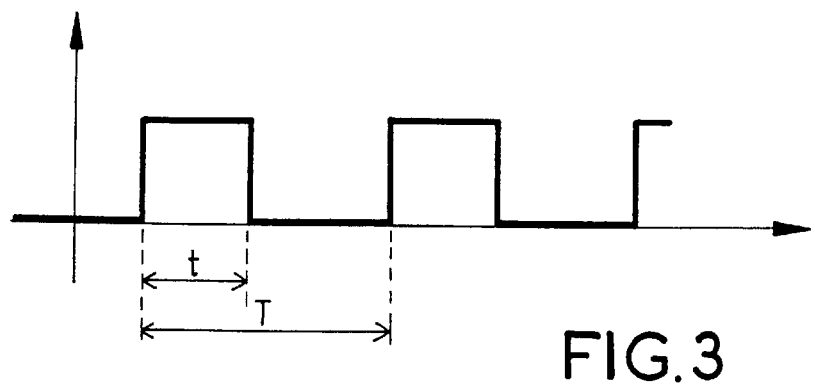
FIG. 3 represents an example of control signal of an actuator, shown in the form of timing diagram.

In FIG. 1, the actuator 1 is for example a pneumatic cylinder working in translational motion. The position of an output shaft of the actuator 1 is measured by means of a transducer 2. In the further description the position of the output shaft will be called output variable of the actuator 1. The measurement made by the transducer 2 is shown on FIG. 1 by the arrow 3. The transducer 2 delivers information representative of the output variable of the actuator 1. This data is conveyed to a comparator 4. Conveniently the data delivered by the transducer 2 is filtered using a loop filter 5 located between the transducer 2 and the comparator 4. The loop filter 5 notably facilitates avoiding a certain instability of the control device of the actuator 1.

The comparator 4 also receives a set-point representative of the position required for the actuator 1. The comparator 4 compares the set-point to the information representative of the output variable of the actuator 1, supplied by the transducer 2. The result of the comparison is supplied to a controller 7 in the form of an error signal 8. The controller 7 controls the actuator 1 depending on the error signal 8. The control signal of the actuator 1 carried by the arrow 9 is for example proportional to the error signal 8. It is also possible to control the actuator 1 depending on the evolution of the error signal 8, for example depending on its differential coefficient and/or depending on its integral. This type of controller is well known in documentation under the name of Integral Plus Derivative (PID). The controller 7 controls the actuator 1 by means of a valve controlled by a slide vane. The vane is moved by means of a pneumatic solenoid valve controlled by the controller 7. In FIG. 1 the valve and solenoid valve are not shown.

So that automatic control of the actuator 1 position, control using the transducer 2, the comparator 4 and the controller 7, has correct sensitivity, the controller 7 regulates the actual position of the actuator 1 solely on a relatively narrow control band. The control band is defined by the fact that the value that the error signal 8 can take in absolute value remains lower than a limiting value. Outside this control band, the controller 7 is saturated.

Furthermore, in the immediate vicinity of the zero value for the error signal 8, the controller does not produce any control signal. This vicinity is designated dead band. The amplitude of the dead band is very inferior to the amplitude of the control band. The existence of this dead band enables maintaining the actuator 1 in position without untimely operation of solenoid valves when the error is roughly nil.

FIG. 2 takes up the same elements as FIG. 1, i.e. the actuator 1, transducer 2, loop filter 5, comparator 4 and controller 7. Furthermore FIG. 2 shows the means of ensuring the solenoid valve response depending on the set-point over the full range that the actuator can cover. These menns comprise a computer 10 which is capable of modifying the control of the actuator 1, control issued by the controller 7. The computer 10 also receives data relating to the output variable of the actuator 1. This data is for example taken on output of the loop filter 5.

Conveniently the means of ensuring the solenoid valve reponses comprise means to repeat the control signal of the actuator 1 cyclically. A two-position solenoid valve can in fact have an uncertain position. In fact, a two-position solenoid valve generally comprises an electromagnet comprising a permanent magnet in its magnetic circuit. The permanent magnet ensures an initial stable position which can be maintained even in the absence of electric supply of the electromagnet. For example a second stable position is obtained by using a spring or else through a second electromagnetic circuit. The two-position solenoid valve works in such a manner that an electric pulse is sufficient to change from the first stable position to the second. The minimum energy required to change from a stable position to another can vary depending on numerous parameters, notably electomagnet winding resistance, or even temperature of the solenoid valve. Variations in temperature can cause uncertainty as to the position of the solenoid valve. The uncertainty can also be due to bounce from one position to the other. The fact of repeating cyclically the control signal of the actuator 1 facilitates limiting the uncertainty on the solenoid valve position.

FIG. 3 illustrates, in the form of a timing diagram, the cyclical repetition of the control signal of the actuator 1. On this figure the time is represented in x axis and the amplitude of the control signal in y axis. The control signal is for example a roughly rectangular signal of period T. During the first part t of the period T the amplitude of the control signal is sufficient to activate the two-position solenoid valve—and during the rest of the period T the control signal is nil. The first part t represents the width of the pulse of the control signal.

Figure 4:
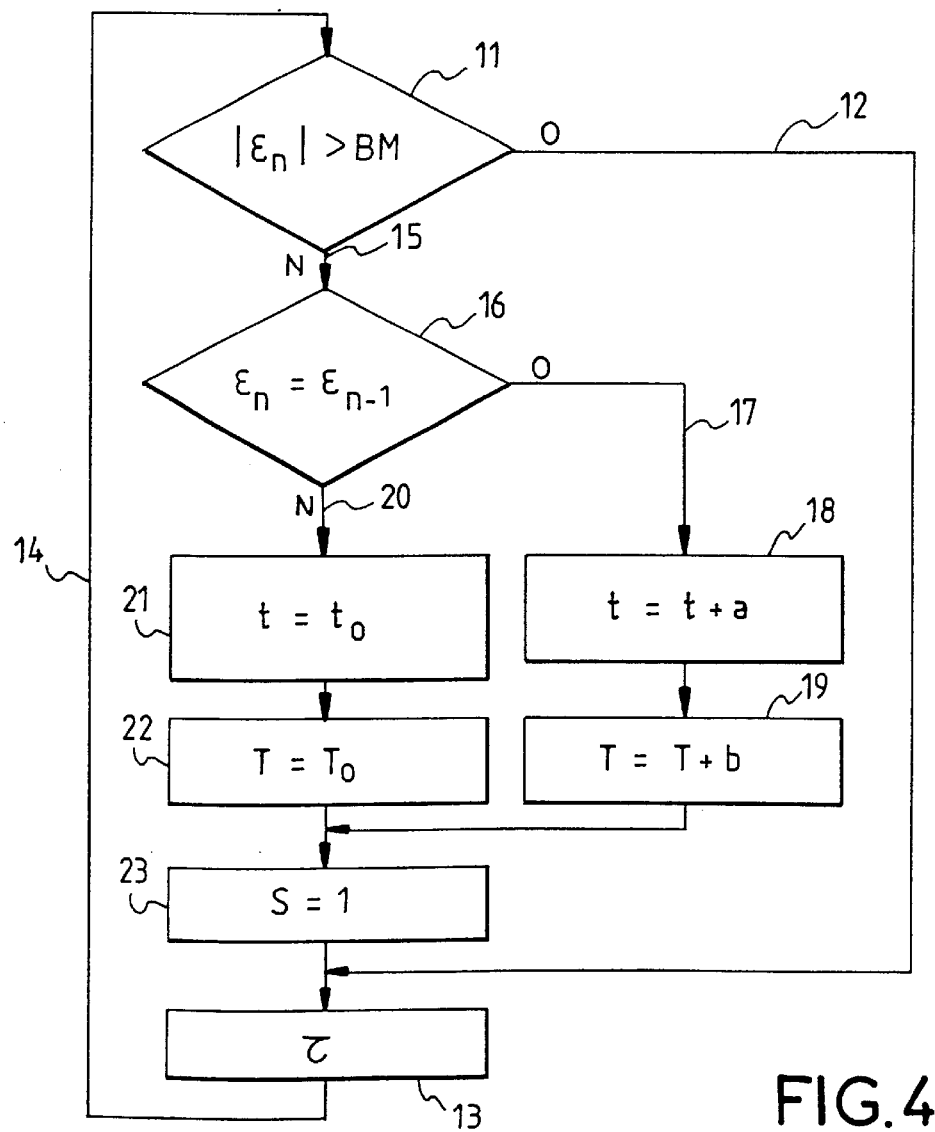
FIG. 4 represents an example of the working synoptic of means so as to be assured of the response of the solenoid valve depending on the set-point over the whole range that the actuator can cover.

FIG. 4 represents an example of working synoptic of the means of ensuring the response of the solenoid valve. The synoptic is shown in the form of a flow chart. At the time of an initial stage 11, a comparison is made to enable determining whether the error signal 8 at a given instant is within the dead band or not. The stage of comparison 11 is noted in the following manner:

$$|\epsilon_n|<BM$$

In this notation $|\epsilon_n|$ represents the error signal measured in absolute value for a given cycle. The absolute value $\epsilon_n$ is compared to BM representing the maximum value that an error signal can take in absolute value in the dead band. When the error signal is within the dead band, exit the comparison stage by the arrow 12 noted 0 on FIG. 3 until reaching a delay time stage 13. The stage of delay time 13 is noted $\tau$ on FIG. 3. At the end of the stage 13 the comparison stage 11 is started again. Continuity of stage 13 towards stage 11 is shown by means of the arrow 14, in this way a new cycle is started.

When the error signal $\epsilon_n$ is not within the dead band, exit stage 11 by the arrow 15 noted N to enter into a new stage of comparison 16. The comparison stage 16 compares the value of the error signal on the cycle in question with the value of the error signal on the preceding cycle, i.e. before the dwell time $\tau$. In FIG. 4 the comparison stage 16 is noted in the following manner:

$$\epsilon_n=\epsilon_{n-1}$$

where $\epsilon_n$ represents the value of the error signal on the cycle in question and $\epsilon_{n-1}$ represents the value of the error signal on the preceding cycle. The comparison made at stage 16 enables being certain of whether the two-position solenoid valve has effectively changed position.

If the result of the comparison made at stage 16 shows that the error signal $\epsilon$ has remained unchanged, i.e. that the two-position solenoid valve has not been controlled correctly, exit stage 16 by the arrow 17 noted 0. Then stages 18 and 19 are carried out. At stage 18 the pulse width t is increased by a value a and at stage 19 the period of the control signal T is increased by a value b. In order to improve probability of a displacement of the two-position solenoid valve it is sufficient to increase the pulse width t. Nevertheless stages 18 and 19 are conveniently combined in order to preserve more or less constant the average energy conveyed in the control signal.

If on the contrary the result of the comparison made at stage 16 gives information on a displacement of the solenoid valve, i.e. a modification in the error signal $\epsilon$, exit stage 16 by the arrow 20 noted N. One then enters into stage 21 followed by stage 22. At stage 21 the pulse width t is reduced to an initial value to and at stage 22 the period of the control signal is reduced to an initial value $T_0$. After stages 22 or 19, a pulse of the control signal is sent to the actuator 1, pulse width t. This pulse is made at stage 23, this stage is noted S=1, S representing the control signal. After stage 23 one re-enters stage 13 of delay time to later return to the comparison stage 11. It being of course understood that stage 23 will not intervene again as long as a complete period T has not elapsed.

Conveniently, the length of the delay time stage 13 noted $\tau$ depends on the current value T of the control signal period.

Conveniently, when the error signal $\epsilon$ is located more or less in the centre of the dead band, it is necessary to move the slide 30 and 31 a longer time than a cycle time, for example in the region of two to three times the cycle time. In this way, when the error signal ϵ is in the dead band but the slide has not been put back to its inactive position at the first pulse 0 delivered to the corresponding solenoid valve, wait for at least a second pulse 0 before implementing stages 18 and 19 tending to increase the pulse width t and the cycle time T. In other words, correction of pulse width does not occur on the first control fault of a solenoid valve. Wait for a possible fault to repeat itself before correcting the pulse width t.

The initial values of the pulse width $t_o$ and the period T of the control signal can be set at the time of manufacture of the device. But conveniently, one can provide a self-adaptive initial pulse width $t_o$ to take into consideration actual reactions of the device. If no correction is made on a large number of cycles, the initial value $t_o$ can be reduced slightly. If on the contrary each time one returns to the initial value to, the need for a correction is felt, then this initial value $t_o$ is slightly increased.

Figure 5:
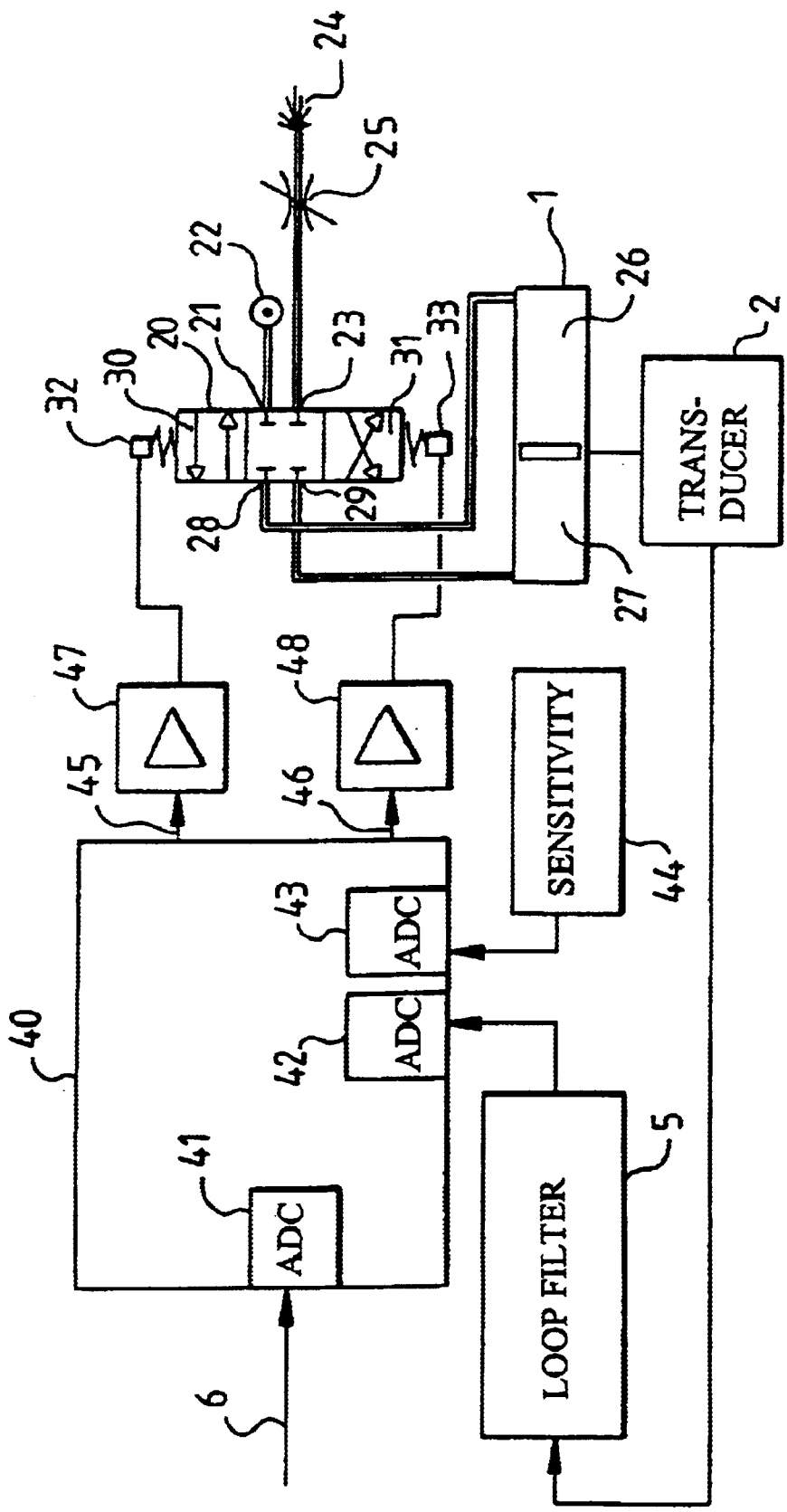
FIG. 5 represents a method of realization for a control device of an actuator.

The control device of the actuator 1 shown in FIG. 5 comprises a four-way, three position control valve with the marking 20. The first gate 22 of the control valve 20 is connected to a source of compressed air 22. A second gate 23 of the control valve 20 is connected to means of exhaust 24, for example through a restriction 25. The actuator 1 is a double-acting jack in this specific realization method. The jack comprises two cylinders 26 and 27. The first cylinder 26 is connected to the third gate 28 of the control valve 20 and the second cylinder 27 is connected to the fourth gate 29 of the control valve 20. The control valve 20 comprises two slides 30 and 31. Slide 30 facilitates connecting the source of compressed air 22 to gate 28 and the means of exhaust 24 to gate 22. The second slide 31 facilitates connecting the source of compressed air 22 to gate 29 and the means of exhaust 24 to gate 28. The slide 30 can be cycled by means of a two-position solenoid valve 32 and slide 31 by means of a two-position solenoid valve 33. The air cylinder 1 for example works in translation and the transducer 2 measures the position of an output shaft of the cylinder 1. The position of the output shaft of the air cylinder is the output variable of the actuator 1, this output variable is delivered at the input of a loop filter 5.

The loop filter 5 notably is designed to avoid certain instability of the control device. It can, moreover, facilitate adjustment of the zero position of the transducer 2. The loop filter also facilitates adjusting the gain of the output variable so that the transducer 2 can measure the whole travel of the air cylinder 1.

The functions carried out by the comparator 4, the controller 7 and the computer 10 are for example made by a microcontroller 40. The microcontroller 40 receives the set-point instruction 6 by means of an analog/digital converter 41. The microcontroller 40 comprises a second analog/digital converter 42 which receives the signal issued by the loop filter 5. The microcontroller 40 is also capable of receiving outside information facilitating the adjustment of device sensitivity through a third analog/digital converter 43. The input means of adjustment for sensitivity are marked 44. This adjustment of sensitivity facilitates, for example, adjusting the width of the dead band and/or that of the adjustment band. The input means 44 are analog. As a variation, input means can be digital and comprise a keyboard. In this case it is not essential to use the analog/digital converter 43. This variation can equally be applied to the set-point instruction 6 thus allowing one to dispense with the analog/digital converter 41. The microcontroller 40 comprises two outputs 45 and 46 each enabling control of solenoid valves 32 and 33 for example through amplifiers 47 and 48.

Electric supply of the microcontroller 40 has not been shown on FIG. 5. This supply draws its energy on the set-point 6. Conveniently the amplifiers 47 and 48 also have the means to store the energy between the pulses t. These means have capacitors for example.

FIGS. 6a to 6d represent different signals in the form of timing diagrams illustrating the workings of the control device. The time is shown as horizontal co-ordinate on the same scale as for all these timing diagrams.

Figure 6A:
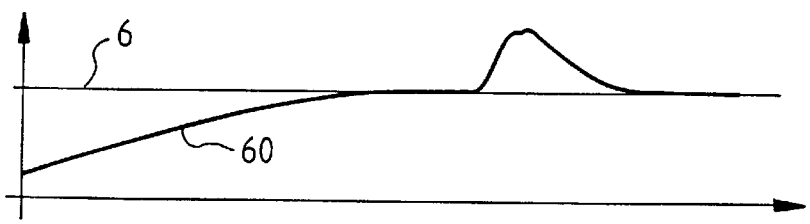
FIGS. 6a to 6d represent different signals, in the form of timing diagrams, illustrating the workings of the control device of an actuator.

FIG. 6a represents the evolution in time of the cylinder jack position in relation to the set-point 6 which here is constant in time. The position of the jack follows a curve 60 which is first of all located well under the set-point 6. Later the curve 60 draws nearer to the set-point 6 until merging with it. Later the curve 60 moves away sharply from the set-point 6. This sharp removal can for example be due to water hammer on the output shaft of the actuator 1. Later the curve 60 draws near again to the set-point 6.

Figure 6B:
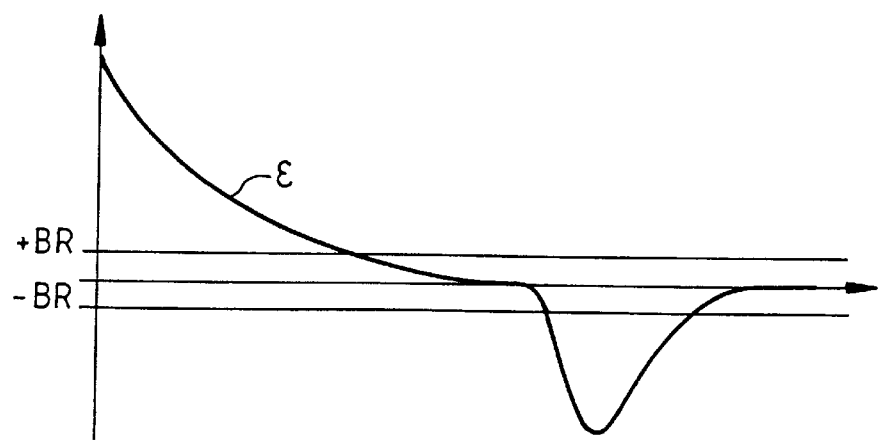

FIG. 6b represents the evolution in time of the error signal ϵ. Amplitude of the adjustment band is between −BR and +BR. As the dead band width is very much lower than that of the adjustment band, the dead band is merged with the time axis. The error signal ϵ follows the evolution of the position of the jack defined by the curve 60.

Curves 6c and 6d represent the control signals of each of the solenoid valves 32 and 33 shown on FIG. 5. On these drawings each vertical line represents diagrammatically a pulse of the control signal. The pulses situated above the time axis represent control pulses which facilitate placing each slide in a so-called active condition between the different gates of the control valve 20. The pulses situated under the time axis facilitate replacing the slide in inactive position in a so-called inactive condition.

Figure 6C:
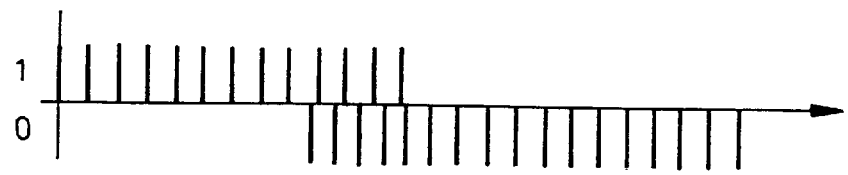
Figure 6D:
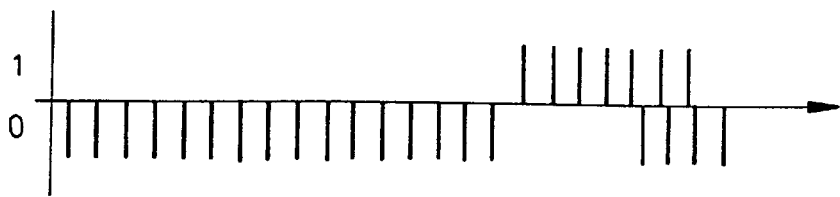

FIG. 6c represents the control signal of the solenoid valve 32 facilitating connection of cylinder 26 to the source of compressed air 22. FIG. 6d represents the control signal of the solenoid valve 33 which allows connection of cylinder 26 to the means of exhaust 24. To make reading of FIGS. 6c and 6d easier, the pulses needed to place the corresponding slide in an active condition situated above the time axis, are noted 1, and pulses of the control signal which enable the corresponding slide to return to an inactive condition are noted 0.

On FIG. 6c as long as the error signal ϵ is not within the adjustment band, pulses 1 are repeated cyclically. Later when the error signal ϵ enters within the adjustment band, one has both pulses 1 and pulses 0. Sharing during a period of a pulse 1 and a pulse 0 is made for example according to the control strategy in modulation of pulse width. Later, when the error signal ϵ overshoots the dead band to become negative or nil, only the pulses 0 are retained.

In the same way on FIG. 6d as long as the error signal ϵ is positive, the control signal comprises only pulses 0. Later when, following the water hammer, the error signal ϵ becomes strongly negative, the control signal comprises a pulse sequence 1. Later, when the error signal ϵ draws near to 0 on entering the adjustment band, there is a pulse sequence 1 coordinated with pulses 0 so as to gently draw near to the error signal ϵ nil value.

Once the error signal ϵ reaches the dead band the control signals of each of the solenoid valves 32 and 33 comprise only pulses 0.

Figure 7:
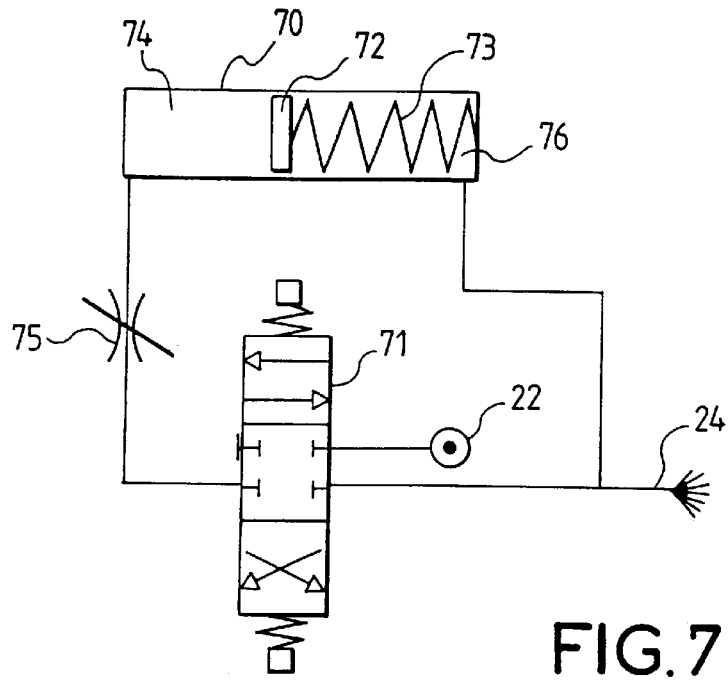
FIG. 7 represents a single-acting jack controlled by a four-way, three position control valve.

FIG. 7 represents the air circuit controlled by a single-acting jack 70 controlled by a four-way three position control valve 71. The jack 70 comprises a piston 72, a spring 73, as well as a cylinder 74. The spring 73 tends to reduce the volume of the cylinder 74. The control valve 71 operates in the same way as control valve 20 shown in FIG. 5. With its two slides, this enables connecting the cylinder 74 either to a source of compressed air 22 or to means of exhaust 24. The cylinder 74 is connected to the control valve 71 through a restriction 75. Another cylinder 76 of the air cylinder 70 in which the spring 73 is located, is permanently connected to means of exhaust 75. The air cylinder 70 can just as well be controlled by a device in compliance with the invention.

Figure 8:
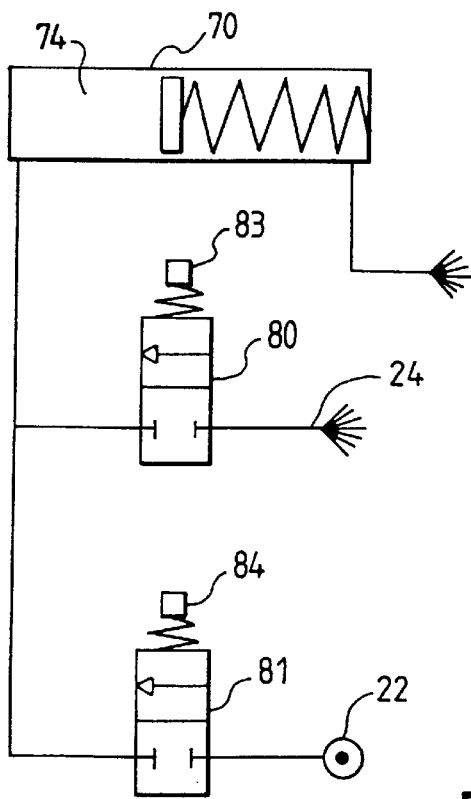
FIG. 8 represents a single-acting jack controlled by two two-way, two position control valves.

FIG. 8 also shows a single-acting air cylinder 70, this time controlled by two control valves 80 and 81. The control valves 80 and 81 are two-way two position control valves. In other words, they comprise two gates and their slides are designed to move between two conditions. Each of the control valves is controlled by a solenoid valve 83 or 84. The control valve 80 enables connecting the cylinder 74 to the means of exhaust 24 and the control valve 81 enables connecting this same cylinder 74 to the source of compressed air 22. Here again the jack 70 and control valves 80 and 81 can be controlled by a device in compliance with the invention.

What is claimed is:

1. A control device for an actuator (1) controlled by a control valve (20; 71; 80; 81), comprising:

slide means (30, 31) for obtaining different conditions of the control valve, a two-position fluidics solenoid means (32, 33) for receiving a set-point instruction (6) to activate the slide means, the control device comprises processor means (10) for assuring the response of the solenoid means depending on the set-point instruction (6) over the full operable range of the actuator (1), by modifying the output of the control device relative to the different conditions of the control valve.

2. The device according to claim 1, further comprising: a transducer (2) delivering information representative of the output variable of the actuator (1), a comparator (4) receiving information delivered by the transducer (2) as well as the set-point (6), the comparator (2) delivering an error signal (8, $\epsilon$), a controller (7) receiving the error signal (8, $\epsilon$) and delivering a control signal (9) from the actuator (1).

3. The device according to claim 1, wherein the processor means (10) for assuring the response of the solenoid valve depending on the set-point instruction comprises means for repeating cyclically the control signal from the actuator (1).

4. The device according to claim 3, wherein the means to repeat the control signal cyclically can shape the control signal in the form of a pulse of given initial width ($t_o$), pulse repeated with a given initial period ($T_o$), and can increase the width (t) of the pulse when the transducer (2) has not detected change in output variable of the actuator (1).

5. The device according to claim 4, wherein when the transducer (2) has detected a change in output variable of the actuator (1), the width (t) of the pulse is reduced to the initial width ($t_o$).

6. The device according to claim 4, wherein the means to repeat the control signal cyclically can increase both the width (t) of the pulse and the period (T) of the signal so as to keep more or less constant the average energy conveyed in the control signal, increase of the width (t) and the period (T) intervening when the transducer (2) has not detected change in output variable of the actuator (1).

7. The device according to claim 6, when the transducer (2) has detected a change of output variable of the actuator (1), the period (T) is reduced to the initial period ($T_o$).

8. The device according to claim 4, wherein the initial pulse width ($t_o$) is adapted depending on the number of times the pulse width (t) has been increased during a number of cycles of the control signal (9).

9. The device according to claim 4, wherein when the error signal ($\epsilon$) is within a dead band (BM), the control signal (9) tends to a nil movement of the actuator (1), and in that the slide means (30, 31) to obtain different control valve conditions must be maintained in an active position for a length of time longer than the period (T) of the control signal (9) cycle so that the error signal ($\epsilon$) leaves the dead band (BM).

* * * * *